(12) United States Patent
DeLuca et al.

(10) Patent No.: US 11,720,480 B2
(45) Date of Patent: Aug. 8, 2023

(54) COLLABORATIVE SOFTWARE EVENT DISCOURSE DECOMPOSITION

(71) Applicant: International Business Machines Corporation, Armonk, NY (US)

(72) Inventors: Lisa Seacat DeLuca, Bozeman, MT (US); Kelley Anders, East New Market, MD (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/216,363

(22) Filed: Mar. 29, 2021

(65) Prior Publication Data
US 2022/0308990 A1    Sep. 29, 2022

(51) Int. Cl.
| | |
|---|---|
| *G06F 9/44* | (2018.01) |
| *G06F 9/455* | (2018.01) |
| *G06F 9/445* | (2018.01) |
| *G06F 11/36* | (2006.01) |
| *G06F 8/73* | (2018.01) |
| *G06N 3/08* | (2023.01) |
| *G06F 16/903* | (2019.01) |
| *G06F 8/30* | (2018.01) |
| *G06F 40/20* | (2020.01) |

(52) U.S. Cl.
CPC ............ *G06F 11/3688* (2013.01); *G06F 8/30* (2013.01); *G06F 8/73* (2013.01); *G06F 11/3664* (2013.01); *G06F 11/3692* (2013.01); *G06F 16/90335* (2019.01); *G06N 3/08* (2013.01); *G06F 40/20* (2020.01)

(58) Field of Classification Search
CPC ............ G06F 11/3688; G06F 11/3664; G06F 11/3692; G06F 16/90335; G06F 8/30; G06F 40/20; G06N 3/08
See application file for complete search history.

(56) References Cited

U.S. PATENT DOCUMENTS

| | | | |
|---|---|---|---|
| 9,270,584 B2 | 2/2016 | Hui | |
| 9,825,866 B2 | 11/2017 | Tanaka | |
| 10,489,728 B1* | 11/2019 | Siconolfi | G06Q 10/063112 |
| 10,860,451 B1* | 12/2020 | Murthy | G06F 11/3075 |
| 11,221,907 B1* | 1/2022 | Sharma | G06F 11/0793 |
| 11,252,052 B1* | 2/2022 | Babu Balasubramani | H04L 43/0817 |

(Continued)

FOREIGN PATENT DOCUMENTS

WO    2007016717 A1    2/2007

OTHER PUBLICATIONS

Sosuke Shiga, Modelling Information Needs in Collaborative Search Conversations, 2017, pp. 715-724. https://dl.acm.org/doi/pdf/10.1145/3077136.3080787 (Year: 2017).*

(Continued)

*Primary Examiner* — Mongbao Nguyen
(74) *Attorney, Agent, or Firm* — Brian D. Welle

(57) ABSTRACT

A ticket relating to a software event is received in a software development system. One or more public forums on software development is searched for the software event. Two or more topics on the software event are identified from one or more conversations from the one or more public forums that regard the software event. Two or more causes of the software event are determined by analyzing interrelations of the two or more topics.

14 Claims, 3 Drawing Sheets

(56) References Cited

U.S. PATENT DOCUMENTS

| | | | | |
|---|---|---|---|---|
| 2010/0223190 | A1 | 9/2010 | Pedersen | |
| 2015/0278748 | A1* | 10/2015 | Anderson | G06Q 30/016 |
| | | | | 705/7.14 |
| 2017/0262360 | A1* | 9/2017 | Kochura | G06F 11/3688 |
| 2018/0121338 | A1* | 5/2018 | Rameshwar | G06F 11/36 |
| 2018/0218306 | A1* | 8/2018 | Rosu | G06Q 10/06375 |
| 2018/0225584 | A1 | 8/2018 | Brown | |
| 2018/0253487 | A1 | 9/2018 | Carteri | |
| 2019/0347148 | A1* | 11/2019 | Gomes Pereira | G06F 11/3466 |
| 2020/0081825 | A1* | 3/2020 | Parbhane | G06F 11/3664 |
| 2021/0004312 | A1* | 1/2021 | Tanaka | G06Q 10/101 |
| 2021/0065086 | A1* | 3/2021 | Lee | G06Q 10/20 |
| 2021/0173760 | A1* | 6/2021 | Downie | G06N 20/00 |
| 2022/0107802 | A1* | 4/2022 | Rao | G06F 16/2453 |

OTHER PUBLICATIONS

Preetha Chatterjee, Exploratory Study of Slack Q&A Chats as a Mining Source for Software Engineering Tools, 2019, pp. 490-499. https://ieeexplore.ieee.org/stamp/stamp.jsp?tp=&arnumber=8816749 (Year: 2019).*

Abhishek Sharma, Analyzing Offline Social Engagements: An Empirical Study of Meetup Events Related to Software Development, 2019, pp. 1-12. https://abhishek9sharma.github.io/files/preprints/meetup.pdf (Year: 2019).*

Rick Kazman, Evaluating the Effects of Architectural Documentation: A Case Study of a Large Scale Open Source Project, 2015, pp. 222-245. https://ieeexplore.ieee.org/stamp/stamp.jsp?tp=&arnumber=7230299 (Year: 2016).*

Chuanqi Tao, Testing and Quality Validation for AI Software—Perspectives, Issues, and Practices, 2019, pp. 120164-120173. https://ieeexplore.ieee.org/stamp/stamp.jsp?tp=&arnumber=8811507 (Year: 2019).*

Muhammad Yasir, Formal in the informal: A multi-level analysis of core Python developers' Tweets, 2018, pp. 1-10. https://ieeexplore.ieee.org/stamp/stamp.jsp?arnumber=8587299 (Year: 2018).*

"Trim string in JavaScript?" Stack Overflow, Jan. 31, 2009, 10 pages. <https://stackoverflow.com/questions/498970/trim-string-in-javascript>.

* cited by examiner

COLLABORATIVE SOFTWARE EVENT DISCOURSE DECOMPOSITION

BACKGROUND

One of the primary methods of troubleshooting software issues includes crowdsourcing the issue. This often involves discussing the issue with peers, though a more common first step is searching the issue online. For example, a software developer may look through a number of online forums to see if anyone had previously encountered this software issue. A developer may be attempting to determine how to fix the issue and/or what caused the issue.

SUMMARY

Aspects of the present disclosure relate to a method, system, and computer program product relating to determining numerous causes of a software event. For example, the method includes receiving a ticket relating to a software event in a software development system. The method also includes searching one or more public forums on software development for the software event. The method also includes identifying two or more topics on the software event from one or more conversations from the one or more public forums that regard the software event. The method also includes determining two or more causes of the software event by analyzing interrelations of the two or more topics. A system and computer program configured to execute the method described above are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
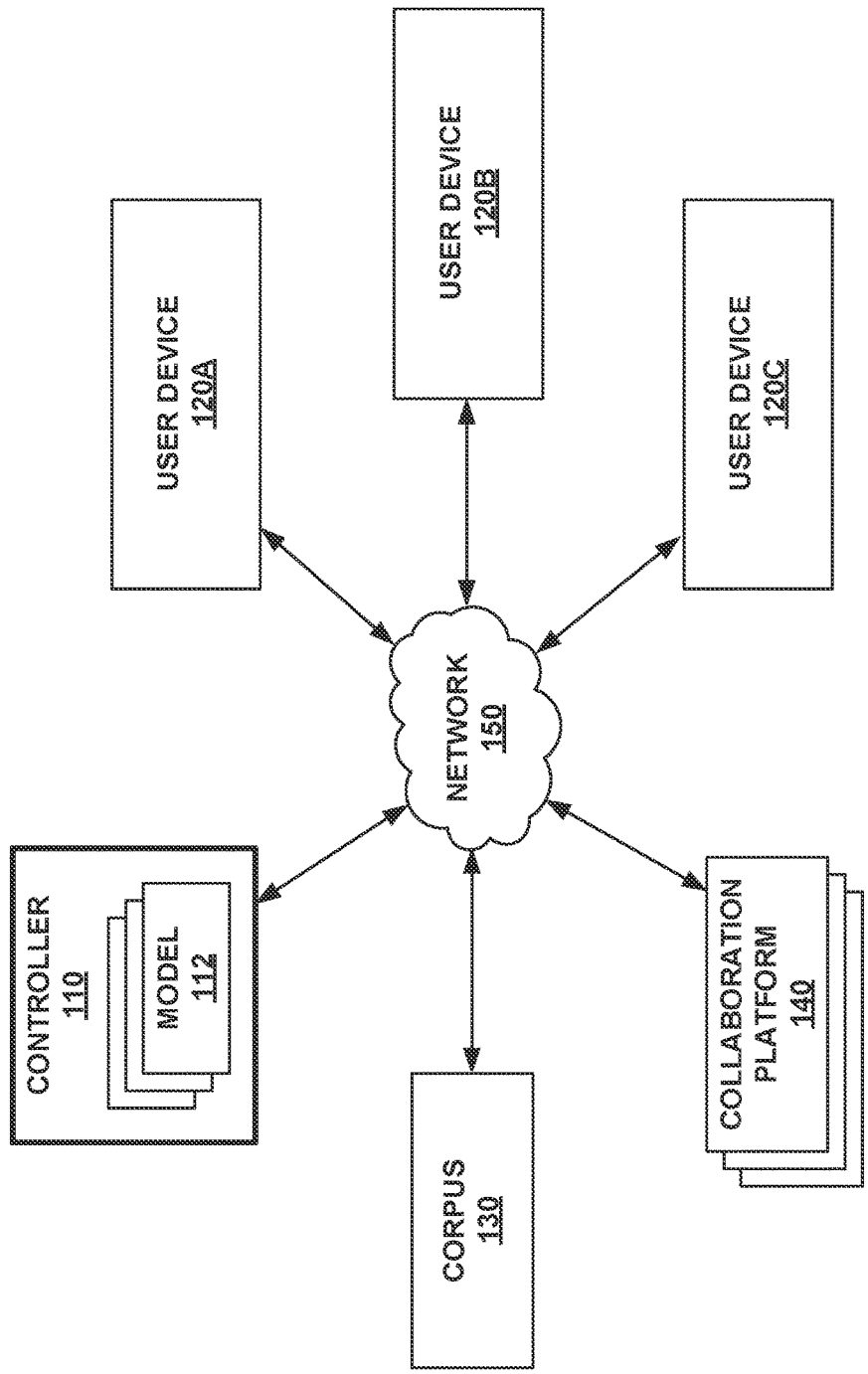
FIG. 1 depicts a conceptual diagram of an example system in which controller may determine one or more causes of a detected software event.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to analyzing natural language conversations regarding software events, while more particular aspects of the present disclosure relate to identifying that a software event has two or more causes by decomposition of collaborative discourse regarding the software event. While the present disclosure is not necessarily limited to such applications, various aspects of the disclosure may be appreciated through a discussion of various examples using this context.

Software applications often cause events that are unpredicted when used by end-users, when tested prior to going live, or the like. Such software events may include objective errors, such as data or graphics not loading, the incorrect data being loaded, data being discarded, the software application unexpectedly closing, an authentication step was skipped/ignored, or the like. Alternatively, or additionally, unpredicted software events may include performance issues, such as a process taking far longer than anticipated to complete.

When such a software event is identified, a typical technique used in the software industry is to generate a "ticket" within a respective software development system, such that a set of identified software events can be organized and tracked as tickets as they are investigated and/or patched. As used herein, a ticket includes documentation of a software event in a format that indicates that a developer and/or a support team should investigate (as, e.g., the software event was unexpected or unwanted). When a software developer starts working on a ticket, a common approach is to check online forums to see if other people have already identified what the root cause is behind the software event, and/or consult with a group of peers regarding the software event. However, for more generic software events that do not have unique identifying error codes or the like, it may be difficult and extremely time consuming to wade through public forums to find a discussion that actually does discuss the relevant software event and, more importantly, actually identifies a cause (and hopefully provides a solution).

A system may be configured to improve this issue by crawling through various public forums to identify other software events that both match a current software event and also include a root cause and/or solution. In some examples, a system may affirmatively identify and/or fetch that root cause and/or solution as identified on that public forum. However, research has shown that humans have a tendency to identify and "latch onto" a single root cause, even though many software events have multiple root causes. As such, the coarseness of these conventional systems may provide incomplete answers to users.

Aspects of this disclosure may solve or otherwise address some or all of these problems. For example, aspects of this disclosure relate to searching one or more public forums and identifying numerous topics that regard the software event, evaluating how each of these topics interrelate regarding each other and the code of the software, and therein identify two or more causes of the software event. A computing device that includes a processing unit executing instructions stored on a memory may provide the functionality that addresses these problems, this computing device herein referred to as a controller.

This controller may be configured to detect a software event (such as by detecting that a software development system receives a ticket regarding the software event) and substantially immediately (e.g., within a few seconds) and autonomously (e.g., without a human causing it) search one or more public forums in response to this detection. For example, the controller may search a few dozen or a few hundred (or more) public forums within a short period of time (e.g., within a minute or two of detecting the software event) for conversations that match the software event. When the controller finds conversations that match the software event, the controller may identify each unique topic that is discussed within the conversation, where each topic may relate to a different dimension of the software event. For example, each topic may relate to a single unique potential cause of the software event, or a single unique potential solution for the software event, or a single unique atypical characteristic of the software event (e.g., that itself may be important to determine a cause or solution), or the like.

The controller may use natural language techniques and/or analysis of the software application itself (e.g., where the controller has access to the base code) to analyze the conversations and identify causes of the software event. For example, the controller may identify and focus on those topics or ideas upon which the public crowd has focused (e.g., as identified by the majority of the comments agreeing with the suggestion of the topic, as identified by the number of "likes" or "upvotes" or the like on comments that provide this topic, and/or for which another commenter indicates that the response solved the problem), but the controller may further look at each additional topic and evaluate each of these individually, and/or on their own merits. For another example, the controller may identify that a second topic received far less upvotes than a first topic but also was posted more recently than the first topic was discussed, such that the second topic is more timely (e.g., as some systems/protocols have been modified since the first topic was previously discussed). For another example, the controller may use natural language processing (NLP) techniques (e.g., such as latent Dirichlet analysis (LDA), the creation/manipulation of knowledge graphs, cosine similarity determinations, word charts, etc.) upon a number of conversations to identify emergent ideas or topics (and/or connections thereof amongst a large number of conversations). For another example, the controller may identify that a first topic has more upvotes than a second topic, but that the second topic was provided by someone that is identified as an expert in the field while the first topic was provided by someone that is identified as a novice (e.g., such that, in some examples, the expert may be more likely to identify a correct cause and/or solution). For another example, the controller may identify that a first topic suggests changing steps of a process from XYZ to ABC, upon which controller investigates code and/or configuration settings of the software application and/or environment to see that the code currently has steps DEF (e.g., such that the first topic does not apply).

The controller may provide and/or recommend these causes and/or solutions. For example, the controller may input the causes and/or solutions into the ticket, and/or the controller may send a message to one or more users with the causes and/or solutions. In some examples the controller may provide generated data behind these causes and/or solutions, such as results of the LDA analysis, cosine similarity determinations, the knowledge graph, word charts, or the like. The controller may provide and/or recommend these causes and/or solutions in this manner substantially immediately upon detecting them, such as within a few seconds of detecting the software event and/or ticket.

In some examples, the controller may independently determine solutions not explicitly provided within a single comment within the public forums. For example, the controller may identify that numerous different forums discussed various processes that were slowing down steps, upon which the controller may investigate the code and identify some lines that are not working as intended and/or are broken, upon which the controller may identify a way to replace the current lines with different lines of code that serve the same purpose without causing the same problems. The controller may utilize documentation (e.g., such as notes within the code or the like) to verify that the new lines of code serve the same purpose as the original lines of code. In some examples, the controller may identify new lines of code that are fewer in number than the previous lines of code, such that the controller effectively condenses the code.

The controller may have access to a testing environment in which the controller may test solutions (and/or attempt to recreate the software event to gather more information about it). For example, as would be understood by one of ordinary skill in the art, software applications such as is used in software-as-a-service (SaaS) applications are used by customers within a "production" environment, where testing and/or modification of code is first executed within one or more software environments that are separate from this production environment (e.g., a testing environment or a quality assurance (QA) environment) but otherwise fully reflect the production environment as much as is possible (e.g., including the same code, having the same data, being capable of porting to similar applications, etc.). The controller may have access to these testing environments such that the controller may test any provided or determined solutions. Alternatively, or additionally, where software is sold as a complete independent package rather than as SaaS, controller may have access to current versions of the full source code so that modification may be tested.

Where the controller has the ability to test for causes and/or solutions, the controller may provide and/or recommend these solutions and/or causes to the users as discussed above (e.g., substantially immediately upon detecting the software event/ticket). In some examples, the controller may provide data or metrics behind these tests (e.g., an amount that performance has been increased, a changed occurrence rate of the software event, or the like). In certain examples, where a software event is minimal enough in degree as determined by the controller (e.g., a graphic showing up in an incorrect color) and a solution is determined by the controller that satisfied a predetermined confidence score (e.g., the solution is identified and/or generated with at least a 98% confidence score), the controller may autonomously provide and/or recommend code for this solution (e.g., provide autonomously generated code as attached to a ticket for a developer). For example, the controller may autonomously recommend code for this solution into the next upcoming patch that will go out for the customer.

Figure 2:
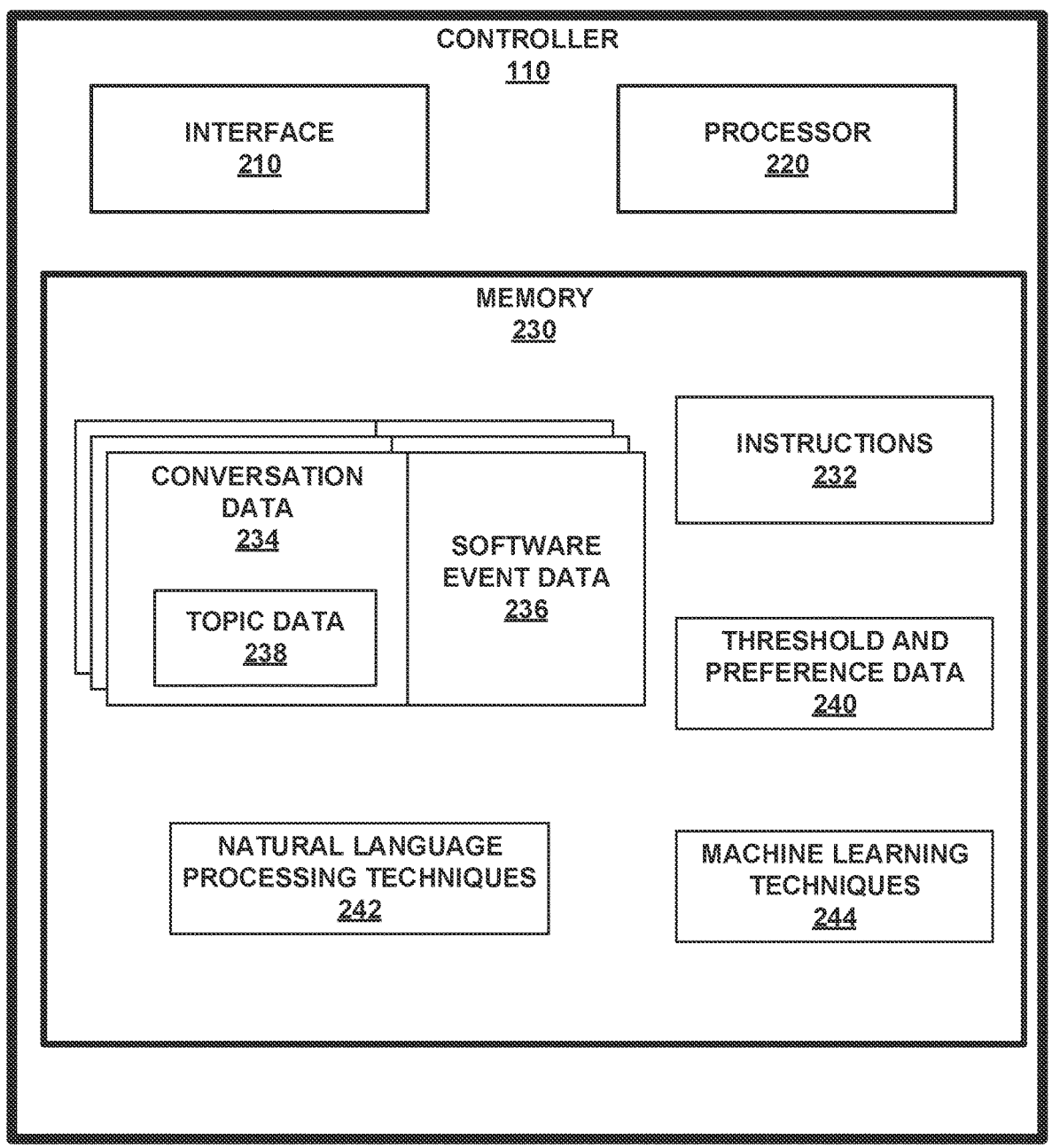
FIG. 2 depicts a conceptual box diagram of example components of the controller of FIG. 1.

For example, FIG. 1 depicts environment 100 in which controller 110 determines numerous causes for software events via collaborative discourse decomposition as discussed herein. Controller 110 may include a processor coupled to a memory (as depicted in FIG. 2) that stores instructions that cause controller 110 to execute the operations discussed herein. Controller 110 may detect a ticket that was received in a software development system. This ticket may have been provided by a developer, an end-user, someone in a help-desk setting, or the like. This ticket may relate to a software event. In other examples, controller 110 may detect the software event itself (e.g., by detecting an error code within a computing log or the like).

Controller 110 may use NLP techniques to analyze the ticket and identify what the ticket is about. Controller 110 may identify conversations that relate to the software event by determining identifying elements of the software event (e.g., a code language, a platform, a query that is failing, details over what action triggered the software event (if known), what was expected to happen, what did happen, or the like) and therein searching a plurality of public forums for conversations that have some or all of these individual identifying elements.

For example, controller 110 may search one or more collaboration platforms 140 for conversations that relate to software events with some or all of these identifying elements. Collaboration platforms 140 may include online conversation boards or the like for people to discuss various software events. Controller 110 may identify such information as what was said, whether any comments positively or negatively respond to a previous comment, whether any comments were upvoted or downvoted, whether any comments were provided by someone who is identified as an expert (e.g., an expert as identified on the forum itself, or an expert as independently verified by controller 110 searching the Internet for data on the person who posted the comment), or the like.

In other examples, controller 110 may identify and analyze communication between one or more user devices 120A-120C (collectively, "user devices 120"). For example, controller 110 may identify discourse over a chatting application, email, or the like. Controller 110 may gather this data only after an opt-in from an appropriate party (e.g., the users themselves, a business leader that manages and/or employs the users of user devices 120). Controller 110 may gather some or all such communication for analysis.

Controller 110 may gather this data in real-time as user devices 120 communicate. For example, controller 110 may intercept messages that are sent between user devices 120 on network 150 to analyze the software event. For example, controller 110 may identify a type of software event as relating to a given domain (e.g., where the domain indicates what a facet of the software event, or a realm of the software event), in response to which controller 110 may analyze all communication of which controller 110 has access between a substantial number of user devices 120. For example, though only three user devices 120 are depicted in FIG. 1 for purposes of illustration, controller 110 may monitor communication in real-time across dozens or hundreds or thousands of user devices 120. Controller 110 may monitor this communication to determine what topics are discussed as provided herein, and identifying and analyzing interrelations between these topics between real-time messages (e.g., and also between these real-time messages and data from corpus 130 and from a ticket as discussed herein).

For example, as discussed herein, analyzing interrelations may include identifying semantic and/or logical relationships between how and when terms are used, events are discussed, potential causes are suggested, potential solutions are deliberated, or the like. Controller 110 may identify and analyze how a substantial number of elements are discussed in different ways by different people in different roles using different computing devices, where each of these differences is recognized as a unique factor that can be weighed in determining causes and/or solutions for a software event.

For example, controller 110 may identify a plurality of messages that are being transmitted between user devices 120 in real-time, where some messages explicitly mention the software event and some effects of the software event, other messages mention the domain of the software event and those same effects (without explicitly identifying the software event), other messages identify those same effects and potential solutions (without mentioning the software event and/or the domain), other messages identifying the domain of the software event and a recent patch (without mentioning the effects or potential solutions), and other messages identify the recent patch and a subsequent patch (without mentioning the software event, the effects, or potential solutions for the effects). Controller 110 may identify that each of these messages may be interrelated, even though none of these messages identify each of topics in a single message (e.g., such that none of the messages discuss each of the software event, effects of the software event, the potential solutions for the effects, the recent patch, and the subsequent patch in a single message or in a single conversation of messages). However, despite the fact that none of these messages and/or conversations include all topics, controller 110 may identify that each of these relate to software event as discussed herein and analyze interrelations of these topics.

For example, controller 110 may analyze these interrelations by attempting to determine logical relationships, semantic relationships, technical relationships, or the like between the messages. In some examples, as discussed herein, controller 110 may compare ideas and suggestions within the messages with the code to determine whether these ideas and/or suggestions might be accurate. In the above provided example, controller 110 may determine that a root cause of the software event was a combination of new code and new settings that resulted from the recent patch, and that some but not all potential solutions are within the subsequent patch, but a combination of the subsequent patch and the potential solutions would appear to fix all of the effects and therein address the software event. As such, controller 110 may autonomously recommend that this subsequent patch be supplemented with the identified potential solutions to address the software event.

In some examples, controller 110 may determine some messages to be potentially related as a results of a timing at which these messages are sent. For example, a first set of messages may all discuss changing a configuration setting of a software application at a first moment in time, and a second set of messages may all discuss a set of problems that are starting to occur at a second moment in time that closely follows the first moment in time. Even where the first set of messages do not discuss the set of problems (e.g., being as the users that sent the first set of messages are unaware of the problems) and where the second set of messages do not discuss the configuration setting change (e.g., being as users that sent the second set of messages are unaware of the change), controller 110 may determine that these messages are interrelated as a result of their closeness in time (e.g., where the second set of messages started occurring at a rate above a threshold within a minute of the first set of messages). In some examples, controller 110 may track progress of software patch updates and/or configuration changes as they occur across user devices 120 and compare these to subsequent messages sent in real-time by these user devices 120, therein analyzing interrelations between these factors in order to determine causes and/or solutions as discussed herein.

In some examples, controller 110 may pull all of these conversations within corpus 130 for analysis. This corpus 130 may include a mixed repository of data, such as public and/or private data from the Internet, a structured and/or curated database, or the like. Corpus 130 may include previous tickets received and/or closed within the software development system. In some examples, corpus 130 may include data that has been gathered and previously categorized by controller 110.

Controller 110 may identify a plurality of topics from all of these gathered conversations. A topic may include a branch of a conversation that suggests a potential cause of a software event, a potential solution to the software event, a potential distinct consideration that should be made for any solution for a software event, or the like. For example, a first topic may include a user indicating that a first cause is responsible for the software event, a second topic may include a user indicating that a second cause is responsible for the software event, a third topic may include a user indicating a solution for the software event, while a fourth topic may include a user suggesting that any possible solution should account for consideration ABC. Alternatively, or additionally, topics may instead be general fact gathering comments (e.g., asking what patch a system has). Put differently, a topic may include anything that controller 110 will independently evaluate (e.g., rather than merely use to change the analysis/weight of another existing topic) in determining a cause of and/or solution for a software event.

Controller 110 evaluates the identified topics from the full set of conversations on the public forums as, e.g., compiled on corpus 130. Controller 110 may use the NLP techniques described above on the full set of conversations. For example, controller 110 may gather a dozen, a hundred, a thousand, or more comments relating to the software event, upon which controller 110 may use NLP techniques, such as LDA, the generation of knowledge graphs, cosine similarity, word charts, branching process, or the like to identify and evaluate topics of these comments. Using these NLP and corpus analysis techniques, controller 110 may identify emergent topics, topics that are overrepresented, topics that are underrepresented, or the like. For example, controller 110 may identify that within ten conversations regarding the software event found among public forums and complied within corpus 130, eight different solutions have been identified as the primary consensus among the different conversations, where only one of these solutions was also identified as a potential solution on all ten conversations.

Once controller 110 has pulled each of real-time conversations/messages between user devices 120, discussions within collaboration platforms 140, and/or all relevant historical ticket information from corpus 130, controller 110 may analyze interrelations between topics among this full set of data. For example, controller 110 may analyze how the different potential causes, solutions, and effects are discussed are and were analyzed by different people, account for such factors as the expertise of these people, the systems being utilized by these people (e.g., versions of software being used, specs of different user devices 120 on which the software event was experienced, different settings of software applications, or the like).

In some examples, controller 110 may independently analyze and/or test some or all topics raised within the public forums regarding the software event. For example, controller 110 may have access to some or all code of the software application of the software event, such that controller 110 may compare the code to the identified causes and/or solutions. Controller 110 may execute a process of "ingesting" the code of the software application so that it can be compared, where this process includes identifying all code (e.g., including individual routines and sub-routines within the code), identifying all documentation (e.g., including notes within the code itself), identifying all configurations (e.g., current settings as selected within the software environment), or the like. Once code is ingested, controller 110 may identify whether or not the comments suggest that a root cause is logic that matches or does not match the code of the software application (e.g., where it is impossible for a root cause to be logic that is not found within the code).

In some examples, controller 110 may identify solutions that did not exist within the public forums. For example, controller 110 may identify that a number of lines create a loop that the comments has indicated is a root cause, and controller 110 may identify that this loop is not necessary (and/or can otherwise be changed). Controller 110 may test such solutions in a testing environment that reflects the production environment (e.g., where a production environment is customer-facing and live). Where controller 110 determines that solutions have a high enough confidence score associated with them, controller 110 may autonomously recommend these solutions to a user. In some examples, where controller 110 determines that solutions have an extremely high confidence score, controller 110 may autonomously implement the solutions itself (e.g., by creating a patch and committing the patch to a source code repository).

Further, in examples where controller 110 autonomously implements the solutions by, e.g., changing, deleting, and/or adding one or more lines of code of a software application, controller 110 may create a record that is associated with the code itself (e.g., in addition to creating a record that is associated with the software event). For example, controller 110 may create and/or update documentation related to the code such that a subsequent programmer could identify that the code was changed, what detected software event precipitated the change, what causes and/or effects controller 110 determined were related to the software event, and/or at what specific public forums/locations one or more solutions were gathered (e.g., and/or where one or more elements of the solutions from which controller 110 independently created the solutions). This may include controller 110 putting in some or all of this information into the code itself as a comment that is adjacent the change/deletion/addition provided by controller 110. By causing controller 110 to provide a comment within the code whenever controller 110 autonomously changes the code as discussed herein (where the code provides a roadmap of how and why controller 110 changed the code), controller 110 may improve a general level of documentation of the code.

In some examples, controller 110 may use machine learning (ML) techniques to learn how to identify root causes and/or solutions for software events such that controller 110 can improve at identifying root causes and/or solutions over time. In certain examples, controller 110 may be divided into numerous increasingly-specialized models 112 as controller 110 learns, such that the specialized models learn increasingly nuanced and intricate causes and solutions that are unique to the given specialty of the respective models 112. Examples of specialties of various models 112 may include site reliability engineering (SRE), Kubernetes, or the like. Controller 110 may use respective models 112 that are specially trained in a certain type of software event in response to seeing that this event matches the software event of the ticket. By specializing models 112 for different types of software events, controller 110 may improve an accuracy and efficiency of identifying numerous root causes (and solutions) of software events.

Controller 110 may interact with user devices 120, corpus 130, and/or collaboration platforms 140 over network 150. Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., computing devices that host/include controller 110, user devices 120, corpus 130, and/or collaboration platforms 130) may receive messages and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user devices 120, corpus 130, collaboration platforms 140, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to determines numerous causes and/or solutions for software events via collaborative discourse decomposition and analysis thereof. Controller 110 may utilize processor 220 to thusly analyze software events. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to identify numerous causes and/or solutions for software events accordingly.

Processor 220 may determine numerous causes for software events via collaborative discourse decomposition according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 determines numerous causes for software events via collaborative discourse decomposition as described herein according to instructions 232 of one or more applications (e.g., software applications) stored in memory 230 of controller 110.

In addition to instructions 232, in some examples gathered or predetermined data or techniques or the like as used by processor 220 to determines numerous causes for software events via collaborative discourse decomposition as described herein may be stored within memory 230. For example, memory 230 may include information described above that is gathered from corpus 130, collaboration platforms 140, and/or user devices 120. For example, as depicted in FIG. 2, memory 230 may include conversation data 234, topic data 238, and software event data 236.

Conversation data 234 may include all conversation data gathered from corpus 130, collaboration platforms 140, and/or user devices 120 that is identified as relating to the software event. For example, conversation data 234 may include data on what each user said what, when that user said it, what a role/title/mastery of each user was, whether any comment was upvoted or downvoted, or the like. Topic data 238 may include specific topics that were identified by controller 110 upon evaluating the conversations. Software event data 236 includes data on what the software event was, such as a time of the software event, a date of the software event, error codes, what did happen in the software event, what was expected to happen, or the like.

Further, memory 230 may include threshold and preference data 240. Threshold and preference data 240 may include thresholds that define a manner in which controller 110 is to evaluate determined causes and/or provide determined causes and/or solutions. For example, threshold and preference data 240 may include confidence scores at which controller 110 is to suggest solutions, and/or a certain confidence score at which controller 110 would autonomously implement a solution. Threshold and preference data 240 may also include preferences as to whether any users are to be trusted more (such that controller 110 puts more weight on their comments) during conversations. For example, a user may be able to modify weights associated with different users for different domains, where a first user is a subject matter expert (SME) when it comes to Kubernetes but a novice in SRE, while a second user is a novice in Kubernetes and a SME in SRE, etc.

Memory 230 may further include natural language processing (NLP) techniques 242. NLP techniques 242 can include, but are not limited to, semantic similarity, syntactic analysis, and ontological matching. For example, in some embodiments, processor 220 may be configured to natural language data as gathered from user devices 120, corpus 130, and/or collaboration platforms 140 to determine semantic features (e.g., word meanings, repeated words, keywords, etc.) and/or syntactic features (e.g., word structure, location of semantic features in headings, title, etc.) of this natural language data. Ontological matching could be used to map semantic and/or syntactic features to a particular concept. The concept can then be used to determine various topics of messages, and to divide the message into a group of elements. In this same way, controller 110 may identify which comments within a conversation include different topics (and therein identify how all users across all conversations feel about each different topic within the different conversations) as described herein.

Memory 230 may further include machine learning techniques 244 that controller 110 may use to improve a process of identifying two or more root causes of software events as described herein over time. Machine learning techniques 244 can comprise algorithms or models that are generated by performing supervised, unsupervised, or semi-supervised training on a dataset, and subsequently applying the generated algorithm or model to bind autonomous agent 112 to users. Using these machine learning techniques 244, controller 110 may improve an ability of collaborative discourse decomposition over time. For example, controller 110 may identify over time certain types of causes or solutions that are more likely to exist or succeed (respectively) within different domains, such that these root causes and solutions are provided when working within these domains to improve a rate of accurately analyzing software events over time.

Machine learning techniques 244 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
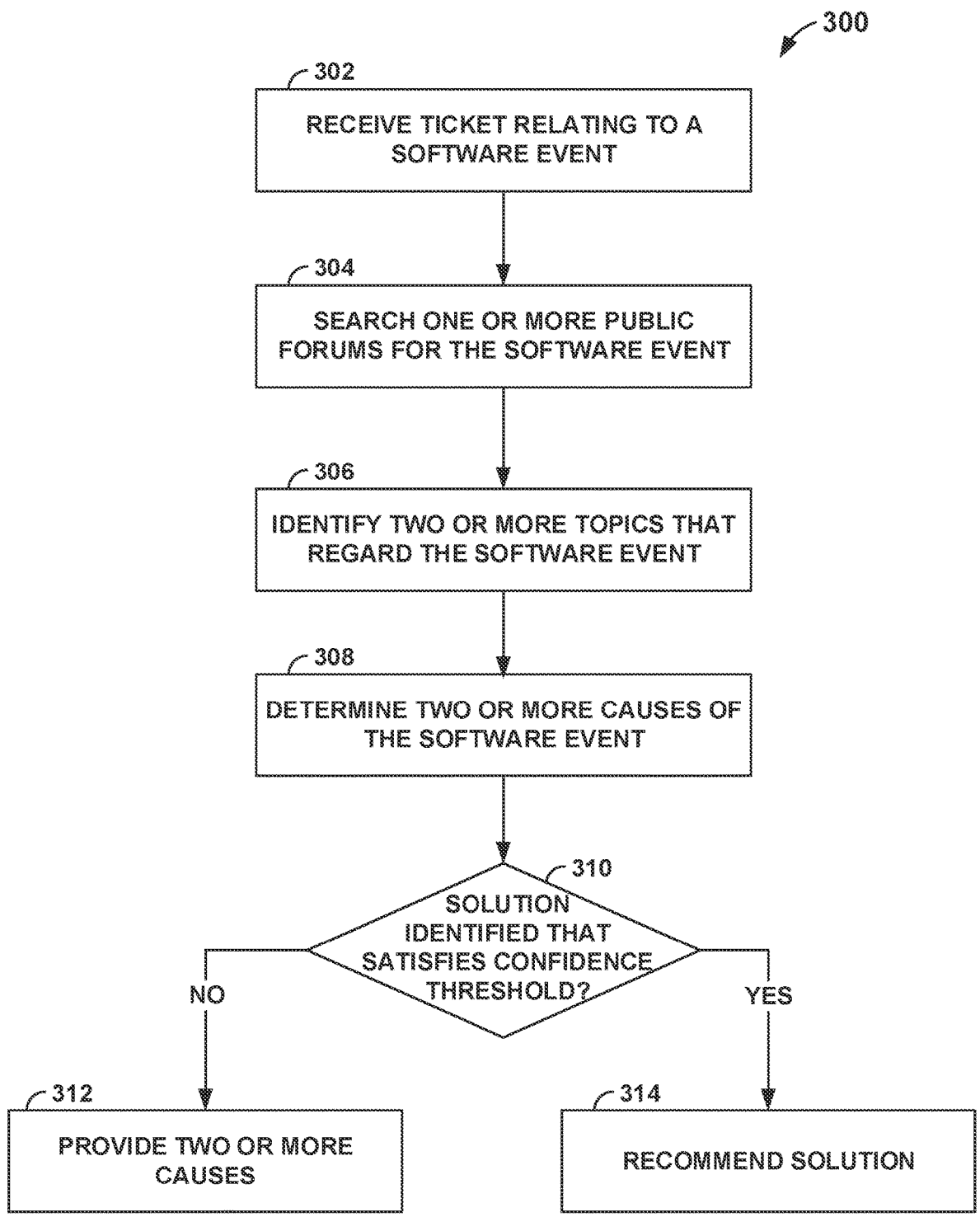
FIG. 3 depicts an example flowchart by which the controller of FIG. 1 may determine one or more causes of a detected software event.

Using these components, controller 110 may decompose collaborative discourse of a software event to identify two or more causes (and provide/recommend solutions as applicable) as discussed herein. For example, controller 110 may decompose collaborative discourse according to flowchart 300 depicted in FIG. 3. Flowchart 300 of FIG. 3 is discussed with relation to FIG. 1 for purposes of illustration, though it is to be understood that other environments with other components may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 detects a ticket is received relating to a software event (302). The software event might relate to something unexpected or undesired that the software did (or didn't do). A ticket may be entered by an end-user, a software developer, or the like. In some examples, controller 110 may detect the software event itself.

Controller 110 searches one or more public forums on software development for the software event (304). For example, controller 110 may use NLP techniques such as those described herein to identify a number of core elements of software event, such as a coding language or platform, a user action that caused the software event, what was expected to happen, what did happen, or the like. Controller 110 may search user devices 120 and/or collaboration platforms 140 for conversations that include some or all of these core elements, identifying all conversations that seem to match the software event, and may compile all found conversations within corpus 130.

Public forums may include fully public forums (e.g., such as online bulletin boards) and semi-public forums (e.g., such as discussions over chatrooms that are internal to a company that received the ticket. In some examples, controller 110 may prioritize any forum that has an association to an organization that received the ticket, such as help pages related to the organization, chat rooms of the organization, emails sent within the organization, or the like.

Controller 110 identifies two or more topics on the software event from the corpus that regard the software event (306). As discussed herein, a topic includes a topic of conversation or a discourse over a potential cause of the software event, and/or a solution for the software event. Controller 110 may use NLP techniques to distinguish between topics and determine, e.g., when different messages of the same or different forums and/or conversations are relating to the same topic or different topics.

Controller 110 determines two or more causes of the software event (308). Controller 110 may determine when there are two or more causes even when the discourse from the public forum identified a single root cause of the software event. For example, controller 110 may determine that commenters of a forum identified a first single cause for the software event, while a comment that was provided more recently than the primary conversation identifies a different cause that was ignored by the rest of the commenters (or provided too late to be considered by many of the previous commenters). In some examples, controller 110 may have access to code of the software, and may compare ideas within various topics to the code itself to determine whether or not causes are correct.

In some examples, controller 110 may determine a domain of the software event and may have a respective model 112 that has been specifically trained in that domain determine two or more causes of the software event. For example, controller 110 may determine that a software event relates to a domain of Kubernetes, DLA, or any other specialty that requires specific knowledge. Controller 110 may determine this domain of the software event by evaluating a ticket that relates to the software event. Once controller 110 determines this domain, controller 110 may identify a respective model 112 that has repeatedly been used to handle software events in this domain. For example, this respective model 112 may have initially undergone supervised or unsupervised machine learning within this domain, such that this respective model 112 has a base level of awareness of terms within this domain. Following this initial configuration process of training this respective model 112 in this domain, controller 110 may repeatedly over time send most or every software event that relates to this domain to this respective model 112, such that this respective model 112 may further learn and become even more specialized over time. By controller 110 utilizing different models 112 that are specialized in different domains over time, controller 110 may improve an accuracy of identifying multiple causes of software events.

Controller 110 determines whether or not a solution is identified that satisfies a threshold confidence score (310). In examples where controller 110 utilizes models 112, controller 110 may cause a respective specially trained model 112 to determine whether or not a determined solution satisfies a threshold confidence score. Controller 110 may identify a solution that was provided by the comments within the conversation, and/or controller 110 may identify a solution autonomously by analyzing the conversations as compared against the code. For example, controller 110 may determine that no solution is provided by the comments or independently generated by controller 110 (NO branch off of 310). Specifically, controller 110 may identify that there is not a single solution either provided by the comments or independently generated by controller 110 that controller 110 is able to verify works with a confidence score that satisfies a confidence threshold. In response to such a determination, controller 110 provides the two or more causes (312). For example, controller 110 may provide a note within the received ticket that identifies these two or more root causes, and/or controller 110 may send an email, message, or the like to one or more user devices 120 identifying these root causes. As discussed herein, controller 110 can provide these root causes along with one or more graphics that were generated during the analysis, such as graphics of a knowledge graph, cosine similarities, word charts, LDA graphics, or the like regarding one or more topics. Controller 110 may provide this information as a note in the ticket itself, as an independent message to one or more users/developers, or the like.

In other examples, controller 110 may identify a solution related to the software event. For example, controller 110 may identify a solution provided on the public forum, and/or controller 110 may independently identify a potential solution, and may implement this solution on a testing environment that reflects the production environment, trying to replicate the software event. If controller 110 can implement the solution such that the software event can't be replicated (and therein is addressed), controller 110 may recommend the solution to a user (314). For example, controller 110 may suggest the specific patch that would fix the code to address the software event. In such examples, controller 110 may also autonomously provide the two or more causes in addition to the solution. Controller 110 may recommend the solution as a note attached to the ticket, and/or controller 110 may recommend the solution as a message to one or more user devices 120.

In certain examples, controller 110 may calculate and/or determine a severity of a software event, which may include detecting how much functionality is altered/available as a result of the software event (e.g., where functionality being unavailable is more severe than functionality being available but slower than expected, where functionality being available but slower than expected is more severe than functionality being fully available at expected times but in an unexpected graphical format). In such examples, controller 110 may determine that the identified solution does or doesn't satisfy the confidence score based on the severity, where, e.g., a more severe event requires a higher confidence score.

In some examples, controller 110 may identify more than one potential solution. For example, controller 110 may identify a few different partial solutions from a few different public forums, and may identify numerous ways in which these partial solutions may be integrated together into a different solutions, such that controller 110 tests each/numerous combinations to determine which performs the best. For another example, controller 110 may identify two or three potential solutions that are indicated within the public forums as potentially solving the issue. In such examples, controller 110 may test each of these solutions within the testing environment and determine which has superior performance (e.g., eliminates the software event with more consistency, results in faster compiling, provides accurate results, requires less lines of code, or the like). Controller 110 may recommend this solution to a user.

In some examples, controller 110 may autonomously implement the solution. For example, where the controller 110 determines that an identified solution has a threshold confidence score and a calculated severity of a potential failed patch is low (e.g., where the patch only impacts a color that is presented), controller 110 may itself change the settings and/or code of a software application without assistance from a human. For example, controller 110 may send a message to a user that indicates this autonomous action that controller 110 is taking at approximately the same moment that controller 110 takes this autonomous action.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a ticket relating to a software event in a software development system;
   searching one or more public forums on software development for the software event;
   identifying two or more topics on the software event from one or more conversations from the one or more public forums that regard the software event;
   ingesting code of a software application of the software event;
   determining two or more discrete causes of the software event by analyzing interrelations of the two or more topics and the code;
   identifying, by analyzing the code, that a solution has at least a threshold rate metric of addressing the software event based on a confidence score for the solution satisfying a threshold;
   autonomously testing the solution in a testing environment that reflects a production environment in response to identifying that the solution has at least the threshold rate metric of addressing the software event, wherein the solution includes changing some of the code;
   verifying that the solution addresses the software event within the testing environment; and
   autonomously recommending the solution for the software event that accounts for all of the two or more discrete causes in order to address the software event in response to verifying that the solution addresses the software event within the testing environment.

2. The computer-implemented method of claim 1, further comprising searching real-time messages of a plurality of conversations between a plurality of user devices for messages that relate to the software event, wherein the analyzing interrelations of the two or more topics includes identifying that some topics of some messages of the plurality of messages of some conversations of the plurality of conversations relate to other messages of the plurality of messages of other conversations of the plurality of conversations.

3. The computer-implemented method of claim 1, wherein the solution is a first solution, further comprising:
   generating, by analyzing the one or more conversations and the code, both the first solution and a second solution that both have at least a threshold rate metric of addressing the software event;
   autonomously testing, in two separate trials, both the first and second solution in a testing environment that reflects a production environment in response to identifying that both the first and second solution has at least the threshold rate metric of addressing the software event, wherein both the first and second solution includes changing some of the code; and
   verifying that the first solution addresses the software event within the testing environment that reflects the production environment with superior performance in comparison to how the second solution addresses the software event within the testing environment,
   wherein the recommending the first solution is in response to verifying that the first solution addresses the software event within the testing environment with superior performance.

4. The computer-implemented method of claim 1, where the solution includes changing some lines of the code, further comprising:
   autonomously changing the some lines of the code per the solution; and
   adding a comment within the code adjacent the some lines, wherein the comment includes information on at least one of the software event, the two or more topics, the one or more conversations, and the two or more discrete causes.

5. The computer-implemented method of claim 1, wherein the solution includes condensing the code.

6. The computer-implemented method of claim 1, wherein:
   a neural network autonomously searches the one or more public forums for the software event and identifies the two or more topics and determines the two or more discrete causes of the software event substantially immediately upon detecting that the ticket is received in the software development system, and
   the neural network autonomously provides a solution for the software event that accounts for all of the two or more discrete causes in order to address the software event substantially immediately upon determining the two or more discrete causes.

7. The computer-implemented method of claim 1, further comprising:
   identifying that the software event is of a domain of software events; and
   sending the software event to a machine learning model that has been trained in the domain of software events to analyze the software event such that:
   the machine learning model searches the one or more public forums for the software event;
   the machine learning model identifies the two or more topics; and
   the machine learning model determines the two or more discrete causes.

8. A system comprising:
   a processor; and
   a memory in communication with the processor, the memory containing instructions that, when executed by the processor, cause the processor to:
   receive a ticket relating to a software event in a software development system;
   search one or more public forums on software development for the software event;
   identify two or more topics on the software event from one or more conversations from the one or more public forums that regard the software event;
   ingest code of a software application of the software event;
   determine two or more discrete causes of the software event by analyzing interrelations of the two or more topics and the code;
   identify, by analyzing the code, that a solution has at least a threshold rate metric of addressing the software event based on a confidence score for the solution satisfying a threshold;
   autonomously test the solution in a testing environment that reflects a production environment in response to identifying that the solution has at least the threshold rate metric of addressing the software event, wherein the solution includes changing some of the code;
   verify that the solution addresses the software event within the testing environment; and
   autonomously recommend the solution for the software event that accounts for all of the two or more discrete causes in order to address the software event in response to verifying that the solution addresses the software event within the testing environment.

9. The system of claim 8, the memory containing further instructions that, when executed by the processor, cause the processor to search real-time messages of a plurality of conversations between a plurality of user devices for messages that relate to the software event, wherein the analyzing interrelations of the two or more topics includes identifying that some topics of some messages of the plurality of messages of some conversations of the plurality of conversations relate to other messages of the plurality of messages of other conversations of the plurality of conversations.

10. The system of claim 8, wherein a neural network autonomously searches the one or more public forums for the software event and identifies the two or more topics and determines two or more discrete causes of the software event substantially immediately upon detecting that the ticket is received in the software development system, wherein the neural network autonomously provides a solution for the software event that accounts for all of the two or more discrete causes in order to address the software event substantially immediately upon determining the two or more discrete causes.

11. The system of claim 8, the memory containing further instructions that, when executed by the processor, cause the processor to:
   generate, by analyzing the one or more conversations and the code, both the first solution and a second solution that both have at least a threshold rate metric of addressing the software event;
   autonomously test, in two separate trials, both the first and second solution in a testing environment that reflects a production environment in response to identifying that both the first and second solution has at least the threshold rate metric of addressing the software event, wherein both the first and second solution includes changing some of the code; and verify that the first solution addresses the software event within the testing environment that reflects the production environment with superior performance in comparison to how the second solution addresses the software event within the testing environment, wherein the recommending the first solution is in response to verifying that the first solution addresses the software event within the testing environment with superior performance.

12. A computer program product, the computer program product comprising a computer readable storage medium having program instructions embodied therewith, the program instructions executable by a computer to cause the computer to:

receive a ticket relating to a software event in a software development system;

search one or more public forums on software development for the software event;

identify two or more topics on the software event from one or more conversations from the one or more public forums that regard the software event;

ingest code of a software application of the software event;

determine two or more discrete causes of the software event by analyzing interrelations of the two or more topics and the code;

identify, by analyzing the code, that a solution has at least a threshold rate metric of addressing the software event based on a confidence score for the solution satisfying a threshold;

autonomously test the solution in a testing environment that reflects a production environment in response to identifying that the solution has at least the threshold rate metric of addressing the software event, wherein the solution includes changing some of the code;

verify that the solution addresses the software event within the testing environment; and autonomously recommend the solution for the software event that accounts for all of the two or more discrete causes in order to address the software event in response to verifying that the solution addresses the software event within the testing environment.

13. The computer program product of claim 12, the computer readable storage medium containing further instructions that, when executed by the computer, cause the computer to search real-time messages of a plurality of conversations between a plurality of user devices for messages that relate to the software event, wherein the analyzing interrelations of the two or more topics includes identifying that some topics of some messages of the plurality of messages of some conversations of the plurality of conversations relate to other messages of the plurality of messages of other conversations of the plurality of conversations.

14. The computer program product of claim 13, wherein the solution is not identified in the one or more public forums.

* * * * *